F. HANSON.
ROTARY HARROW.
APPLICATION FILED FEB. 24, 1912.
1,034,364.
Patented July 30, 1912.
2 SHEETS—SHEET 2.
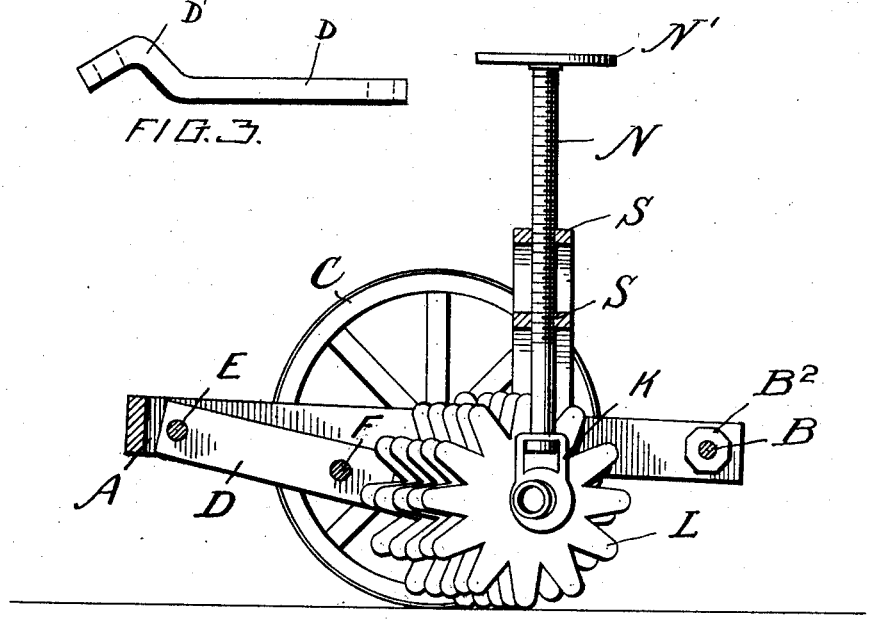
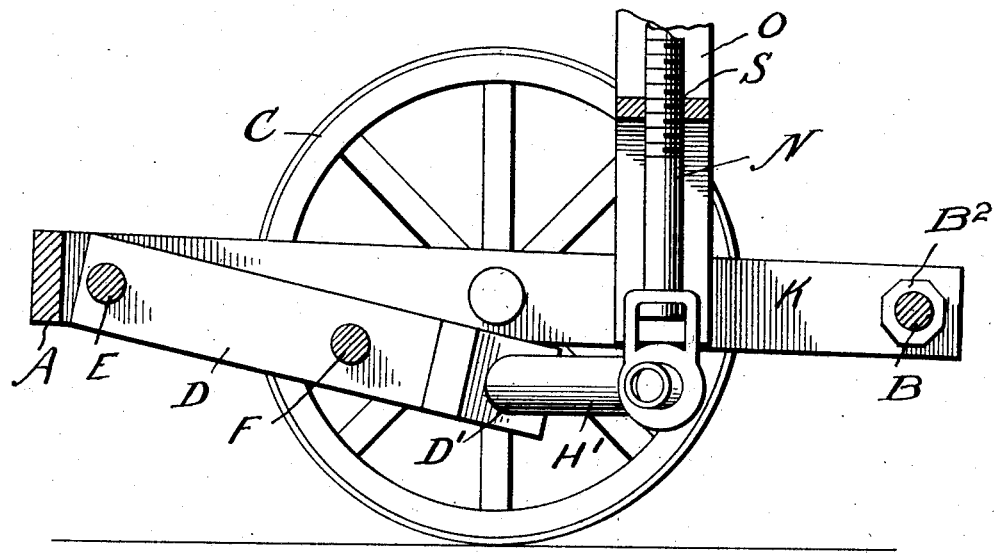

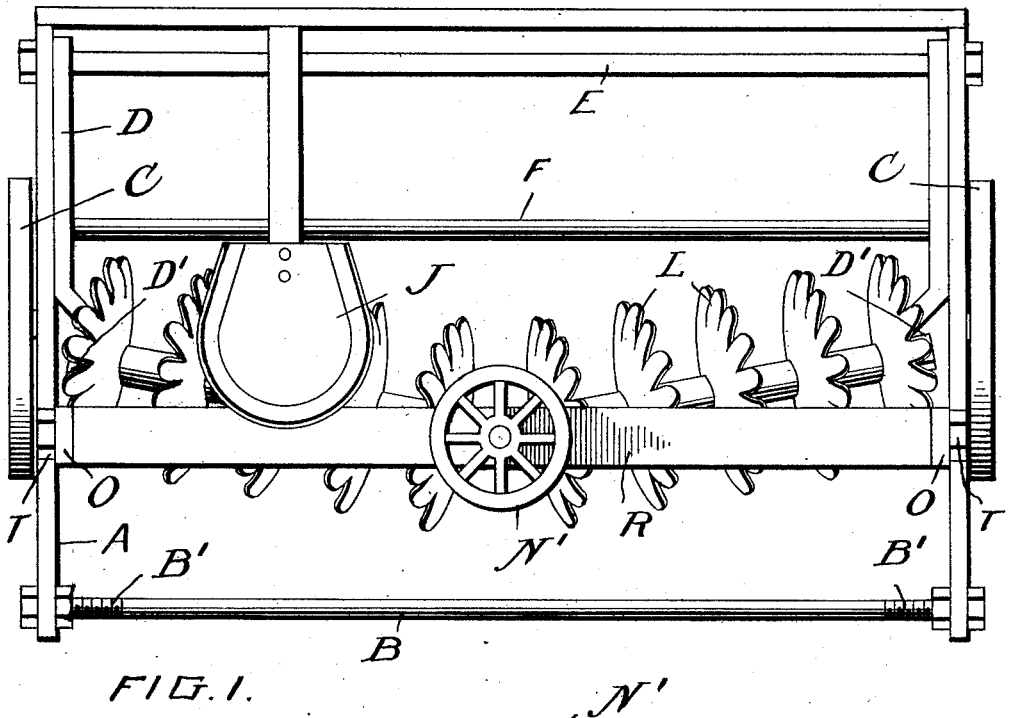
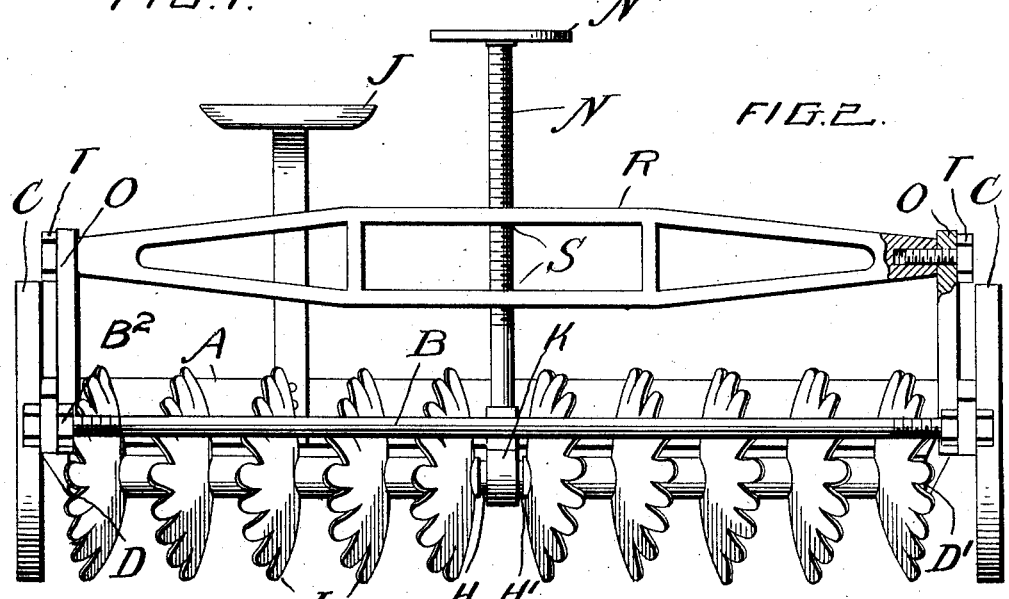

UNITED STATES PATENT OFFICE.

FREEMAN HANSON, OF HOLLIS CENTER, MAINE, ASSIGNOR OF ONE-HALF TO LUCIEN L. CLARK, OF DAYTON, MAINE.

ROTARY HARROW.

1,034,364.　　　　Specification of Letters Patent.　　Patented July 30, 1912.

Application filed February 24, 1912. Serial No. 679,557.

*To all whom it may concern:*

Be it known that I, FREEMAN HANSON, a citizen of the United States, residing at Hollis Center, in the county of York and State of Maine, have invented certain new and useful Improvements in Rotary Harrows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in rotary harrows and consists essentially in the provision of means whereby the harrow disks may be raised and lowered in the ground and held in adjusted positions.

The invention consists essentially of a harrow frame mounted upon suitable wheels and provided with a swinging frame, in the ends of which are journaled harrow disk carrying shafts, the inner ends of which are connected together and adapted to be raised and lowered by an adjusting screw.

The invention consists further in the provision of a rotary harrow comprising a frame in which are journaled the disk carrying shafts, the inner ends of which are connected together and in the provision of a pivotal cross-piece carrying an adjusting screw which is fastened at its lower end to a yoke connected to the hinged ends of the shafts.

The invention comprises various other details of construction and combinations and arrangements of parts which will be hereinafter fully described, shown in the accompanying drawings and then specifically defined in the appended claims.

I illustrate my invention in the accompanying drawings, in which:—

Figure 1 is a top plan view of a rotary and vertically adjustable harrow made in accordance with my invention. Fig. 2 is a rear elevation. Fig. 3 is a central longitudinal section through the cross-piece carrying the adjusting screw. Fig. 4 is a detail view through the connection between the harrow disk carrying shafts and Fig. 5 is a detail view of the end of the rack D.

Reference now being had to the details of the drawings by letter, A designates a frame which may be of any suitable shape and comprises side pieces which are connected together at their rear ends by means of the rod B having threaded ends B' which pass through apertures in the side pieces of the frame and nuts $B^2$ are mounted upon the threaded portions of the rod and bear against the opposite faces of the end pieces of the frame. Said frame is mounted upon suitable wheels C, and a rack D is pivotally mounted upon a rod E, the ends of which are bent as shown and fastened in the opposite ends of the frame A. The end pieces of the rack D are bent twice, as shown in Fig. 5, and are connected together by means of a rod F. Shafts H and H' are journaled at their outer ends in the ends D' of the rack D and their inner ends are journaled on the coupling yoke K which has swiveled thereto the lower end of an adjusting screw N. Said shafts H and H' are provided at their ends with nuts $H^2$ and $H^3$.

Rising from the frame A are the standards O, one at either end of the frame and a truss cross-piece, designated by letter R, has spindle ends which are journaled in apertures in the standards, and nuts T are mounted upon the threaded ends of the spindles of said cross-piece. The two longitudinal pieces of the truss cross-piece are provided with registering apertures S which are interiorly threaded to engage the threads of the adjusting screw, which latter has a hand wheel N' fixed to its upper end and within convenient reach of the seat J which is fastened to any suitable part of the frame.

Mounted upon each of the shafts H and H' is a sleeve I having a series of harrow disks L fixed thereto and spaced apart one from another, said disks having fingers which may be of any shape, preferably curved and provided with blunt ends.

The operation of my invention will be readily understood and is as follows:—By the provision of the construction shown, the shafts may be raised or lowered through the medium of the adjusting screw, thus affording means whereby the harrow disk may be held from the ground when the apparatus is not in use and moved from place to place. As the adjusting screw is raised and lowered by rotating the same through the threaded apertures in the truss cross-piece and as the shafts will travel in the arc of a circle when being raised and lowered, incident to the swinging of the rack D, said truss cross-piece will have a tilting movement to correspond to the swinging movement of the frame carrying the harrow disk.

What I claim to be new is:—

1. A rotary harrow comprising a frame, a rack pivoted thereto, shafts journaled at their outer ends in suitable bearings in said rack, a yoke in which the inner ends of the shafts are journaled, an adjusting screw swiveled to said yoke, and a mounting upon said frame in which said screw is held, as set forth.

2. A rotary harrow comprising a frame, a rack pivoted thereto, shafts journaled at their outer ends in suitable bearings in said rack, a yoke in which the inner ends of the shafts are journaled, an adjusting screw swiveled to said yoke, and a cross-piece upon the frame having threaded apertures engaged by said screw, as set forth.

3. A rotary harrow comprising a frame, a rack pivoted thereto, shafts journaled at their outer ends in suitable bearings in said rack, a yoke in which the inner ends of the shafts are journaled, an adjusting screw swiveled to said yoke, a standard rising from the frame, and a cross-piece mounted in said standard and having threaded apertures for the reception of said screw, as set forth.

4. A rotary harrow comprising a frame, a rack pivoted thereto, shafts journaled at their outer ends in suitable bearings in said rack, a yoke in which the inner ends of the shafts are journaled, an adjusting screw swiveled to said yoke, a standard rising from the frame, and provided with apertures, and a cross-piece pivotally mounted in the apertures of said standards and provided with threaded openings for the reception of the screw, as set forth.

5. A rotary harrow comprising a frame, a rack pivoted thereto, shafts journaled at their outer ends in suitable bearings in said rack, a yoke in which the inner ends of the shafts are journaled, an adjusting screw swiveled to said yoke, a standard rising from the frame and provided with apertures, a truss cross-piece having two parallel portions which are provided with registering, threaded apertures for the reception of said screw, said cross-piece having spindle ends pivotally mounted in the apertures of said standard, and nuts upon said spindle ends, as set forth.

In testimony whereof I hereunto affix my signature in the presence of two witnesses.

FREEMAN HANSON.

Witnesses:
HATTIE D. HOBSON,
WILLIAM P. TOWNSEND.

---

Copies of this patent may be obtained for five cents each, by addressing the "Commissioner of Patents, Washington, D. C."